(12) United States Patent
Wang et al.

(10) Patent No.: US 7,818,470 B2
(45) Date of Patent: Oct. 19, 2010

(54) ADAPTIVE INTERRUPT ON SERIAL RAPID INPUT/OUTPUT (SRIO) ENDPOINT

(75) Inventors: Chi-Lie Wang, Milpitas, CA (US);
Jason Z. Mo, Fremont, CA (US);
Bertan Tezcan, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 269 days.

(21) Appl. No.: 11/863,192

(22) Filed: Sep. 27, 2007

(65) Prior Publication Data
US 2009/0086751 A1  Apr. 2, 2009

(51) Int. Cl.
*G06F 3/00* (2006.01)
(52) U.S. Cl. .............................. 710/18; 710/16; 710/29; 710/30; 710/36; 710/52
(58) Field of Classification Search ........................ None
See application file for complete search history.

(56) References Cited

U.S. PATENT DOCUMENTS

| 4,298,954 | A | 11/1981 | Bigelow et al. |
| 4,335,277 | A | 6/1982 | Puri |
| 5,224,213 | A | 6/1993 | Dieffenderfer et al. |
| 5,257,384 | A | 10/1993 | Farrand et al. |
| 5,717,883 | A | 2/1998 | Sager |
| 6,047,339 | A | 4/2000 | Su et al. |
| 6,271,866 | B1 | 8/2001 | Hancock |
| 6,816,929 | B2 | 11/2004 | Ueda |
| 2004/0225779 | A1 | 11/2004 | Zhao et al. |
| 2005/0283598 | A1 | 12/2005 | Gaskins et al. |
| 2008/0205422 | A1* | 8/2008 | Wang et al. ................. 370/412 |

* cited by examiner

*Primary Examiner*—Alan Chen
(74) *Attorney, Agent, or Firm*—Bever, Hoffman & Harms LLP

(57) ABSTRACT

A serial buffer is configured to transmit a plurality of received data packets through a data packet transfer path to a host processor. A doorbell controller of the serial buffer monitors the number of data packets transmitted to the host processor through the data packet transfer path, and estimates the number of data packets actually received by the host processor. The doorbell controller generates a doorbell command each time that the estimated number of data packets corresponds with a fixed number of data packets in a frame. The doorbell commands are transmitted to the host processor on a doorbell command path, which is faster than the data packet transfer path. The doorbell controller may estimate the number of data packets actually received by the host processor in response to a first delay value, which represents how much faster the doorbell command path is than the data packet transfer path.

19 Claims, 6 Drawing Sheets

ADAPTIVE INTERRUPT ON SERIAL RAPID INPUT/OUTPUT (SRIO) ENDPOINT

RELATED APPLICATIONS

The present application is related to the following commonly-owned, co-filed U.S. patent applications:

U.S. patent application Ser. No. 11/863,184 "MULTI-FUNCTION QUEUE TO SUPPORT DATA OFFLOAD, PROTOCOL TRANSLATION AND PASS-THROUGH FIFO", by Chi-Lie Wang, Jason Z. Mo and Mario Au.

U.S. patent application Ser. No. 11/863,176 "SERIAL BUFFER SUPPORTING VIRTUAL QUEUE TO PHYSICAL MEMORY MAPPING", by Chi-Lie Wang, Calvin Nguyen and Mario Au.

U.S. patent application Ser. No. 11/863,199 "NON-RANDOM ACCESS RAPID I/O END-POINT IN A MULTI-PROCESSOR SYSTEM", by Chi-Lie Wang, Jason Z. Mo, Stanley Hronik and Jakob Saxtorph.

FIELD OF THE INVENTION

The present invention relates to a serial buffer designed to operate as a serial RapidIO (sRIO) end-point to provide data offload, protocol translation and pass-through FIFO functions. More specifically, the present invention relates to a serial buffer that provides an interrupt (doorbell) with a dynamically adjustable timing with respect to corresponding data packets.

RELATED ART

FIG. 1 is a block diagram of a conventional sRIO system 100, which includes serial buffer 101, SRIO host 102 and SRIO bus 105. Serial buffer 101 includes a plurality of queues Q0-Q3 for temporarily storing received data packets. These data packets are transferred through serial buffer 101 using a first transfer path 111. Serial buffer 101 is also configured to receive priority packets, which may specify various actions or commands. The priority packets are transferred through serial buffer 101 using a second transfer path 112.

A priority packet received by serial buffer 101 may identify an operation to be performed by sRIO host 102. The priority packet may be associated with a frame of data packets, which are also received by serial buffer 101. As used herein, a frame of data packets includes a plurality of N data packets, wherein N is an integer greater than 1. The N data packets of a frame are transmitted through the first transfer path 111 of serial buffer 101 to sRIO bus 105. The sRIO host 102 receives these N data packets from sRIO bus 105, and sequentially stores these N data packets in a system memory 120. The associated priority packet is transmitted through the second transfer path 112 of serial buffer 101, and is provided to sRIO host 102 (via sRIO bus 105) as an interrupt command. Within sRIO host 102, system software 121 identifies the received interrupt command, and in response, attempts to access the corresponding frame of N data packets from system memory 120 (such that sRIO host 102 can use the frame of N data packets to implement the interrupt command).

Note that all of the N data packets of the frame must be present in system memory 120 in order for the system software 121 to properly process the interrupt command. However, the first transfer path 111 of serial buffer 101 is typically slower than the second transfer path 112 of serial buffer 101. In this case, it is possible that only M of the N data packets of the frame have been received by system memory 120 at the time that the system software 121 receives the interrupt command. As defined herein, M is an integer less than N. The difference between N and M is defined by a positive integer, X. This relationship is illustrated in FIG. 1, wherein the M received data packets are shown as shaded regions within system memory 120, and the X not-yet-received data packets are shown as blank regions within system memory 120.

If only M of the N data packets have been received by system memory 120 at the time that the system software 121 receives the interrupt command, then system software 121 will not process the X missing data packets (because these X missing data packets are not available in system memory 120). If system software 121 is unable to process the X missing data packets, then target real time applications that implement data sampling and processing will not function properly (because such real time applications require processing of a predetermined amount of sampled data in a predetermined time interval).

This problem is further complicated by the fact that the relative speeds of first transfer path 111 and second transfer path 112 can vary for different sRIO system topologies. Thus, the interrupt latency can be unpredictable from system to system.

It would therefore be desirable to have a serial buffer that is capable of transmitting interrupt commands and the associated data packets to an sRIO host with a well-defined timing relationship. It would further be desirable if this timing relationship were adaptable to different sRIO system topologies.

SUMMARY

Accordingly, the present invention provides a system and method for generating doorbell commands in response to the actual number of data packets transmitted to a host processor and a delay that exists between the data packet transfer path and the doorbell command path.

In one embodiment, a serial buffer is configured to transmit a plurality of received data packets through a data packet transfer path to a host processor. A doorbell controller of the serial buffer monitors the number of data packets transmitted to the host processor through the data packet transfer path, and estimates the number of data packets actually received by the host processor. The doorbell controller generates a doorbell command each time that the estimated number of data packets corresponds with a fixed number of data packets in a frame.

In accordance with one embodiment, the doorbell commands are transmitted to the host processor on a doorbell command path, which is faster than the data packet transfer path. The doorbell controller may estimate the number of data packets actually received by the host processor in response to a first delay value, which represents how much faster the doorbell command path is than the data packet transfer path. The first delay value can be dynamically adjusted to enable the serial buffer to be used in sRIO systems having different configurations.

The present invention will be more fully understood in view of the following description and drawings.

DETAILED DESCRIPTION

Figure 2:
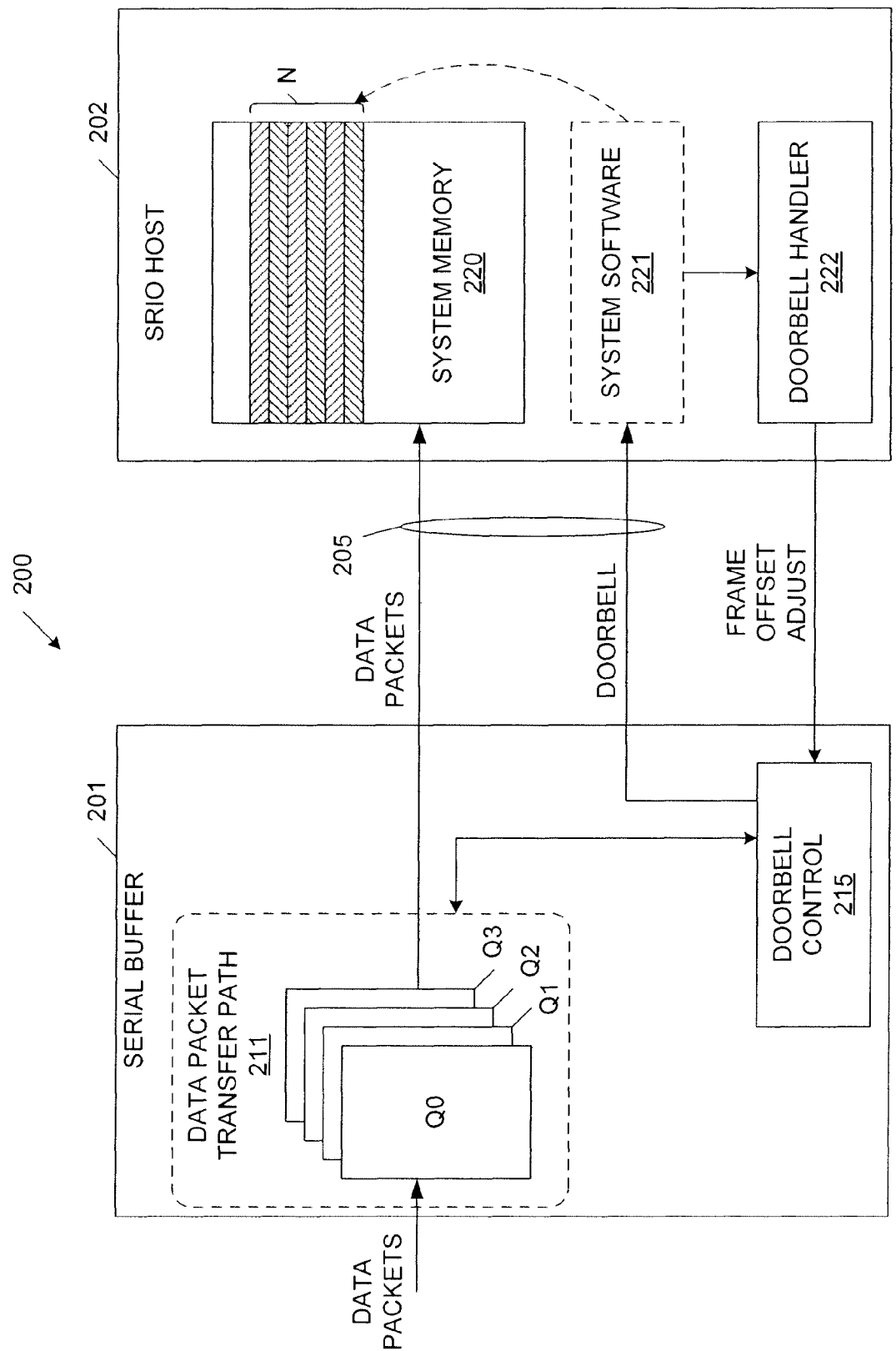
FIG. 2 is a block diagram of an sRIO system in accordance with one embodiment of the present invention.

FIG. 2 is a block diagram of an sRIO system 200 in accordance with one embodiment of the present invention.

SRIO system 200 includes serial buffer 201, SRIO host 202 and SRIO bus 205. Serial buffer 201 is configured to receive both data packets and priority packets (not shown). The data packets are transmitted through serial buffer 201 on a data packet transfer path 211. The data packet transfer path 211 includes a plurality of queues Q0-Q3 for temporarily storing the received data packets. Serial buffer 201 also includes doorbell controller 215, which is used generate doorbell (interrupt) commands associated with the received data packets. Doorbell controller 215 transmits the generated doorbell commands to sRIO host 202 on sRIO bus 205. As described below, doorbell controller 215 generates the doorbell commands in a manner that ensures that all of the associated data packets are available in system memory 220 when the doorbell command is generated.

In accordance with the described embodiment, each frame of N data packets received by data packet transfer path is to be associated with a corresponding doorbell (interrupt) command. The predetermined number N of data packets in a frame is hereinafter referred to as the "frame size", and is designated by the value, F_SIZE. As described in more detail below, doorbell controller 215 operates in response to the frame size value, F_SIZE.

Figure 1:
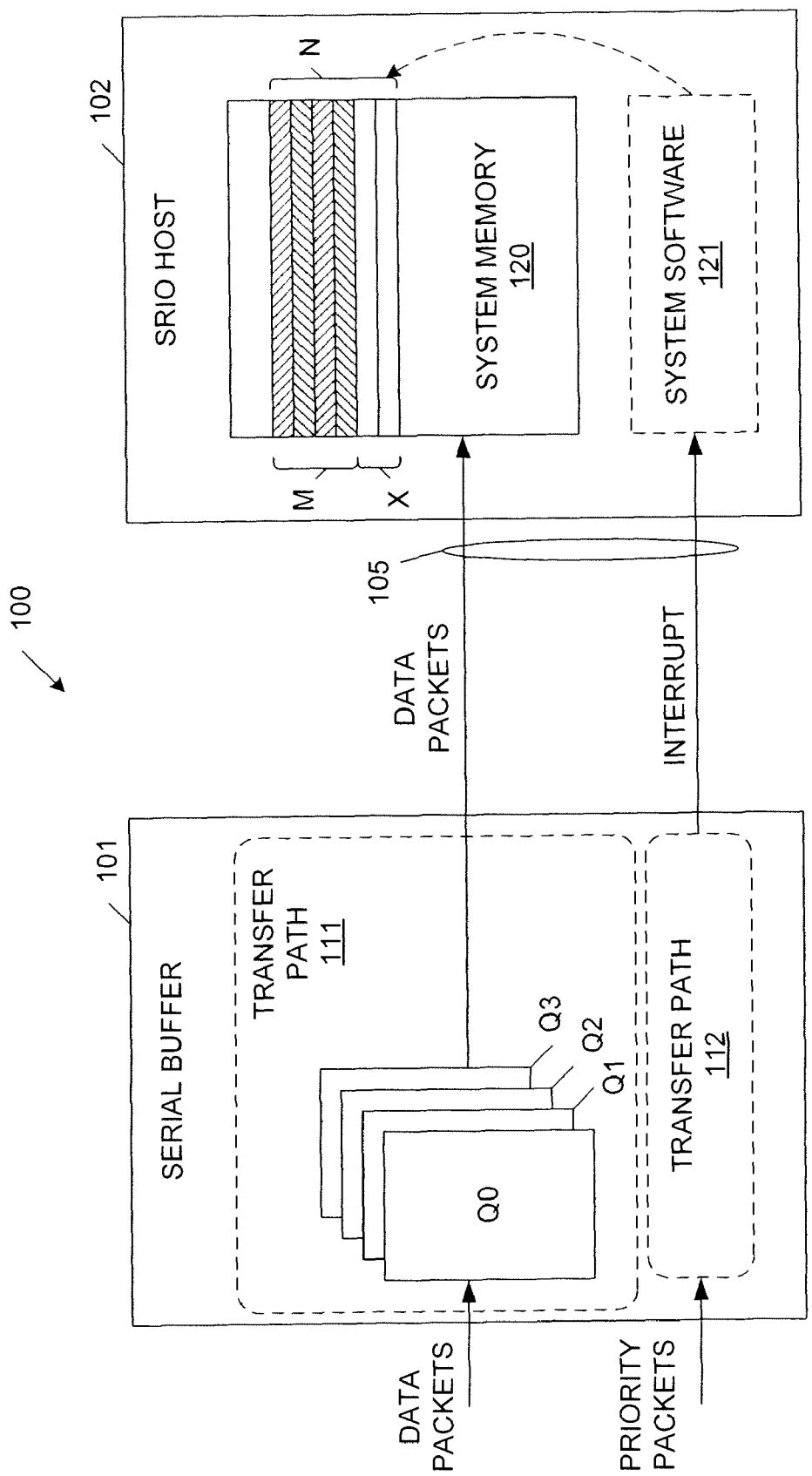
FIG. 1 is a block diagram of a conventional sRIO system, which includes a serial buffer and an sRIO host.

Doorbell controller 215 provides a manner of selecting/adjusting the time at which doorbell commands are transmitted to sRIO host 202. Doorbell controller 215 operates to ensure that the doorbell command is not sent to sRIO host 202 until after the system memory 220 has received the entire associated frame of data packets necessary for the system software 221 to process the doorbell command. As a result, sRIO host 202 is able to reliably process the associated frame of data packets upon receiving the doorbell command. That is, there are no 'missing' data packets as described above in connection with FIG. 1.

Doorbell controller 215 operates as follows to control the generation of doorbell commands in response to the transfer of data packets within the data packet transfer path 211. In general, doorbell controller 215 generates an initial doorbell command only after the number of data packets transferred from serial buffer 201 to sRIO host 202 is equal to the frame size value (F_SIZE) plus a frame offset value (F_OFFSET). The frame offset value (F_OFFSET) is selected to correspond to the delay difference that exists between the data packet transfer path 211 and the doorbell command path (which exists between doorbell controller 215 and sRIO host 202). The frame offset value (F_OFFSET) is specified in units that are defined by the time required to process a data packet within the data packet transfer path 211. Doorbell controller 215 generates subsequent doorbell commands when the number of subsequently transferred data packets reaches the frame size value (F_SIZE). As will become apparent in view of the following disclosure, this ensures that each time a doorbell command is transmitted to the sRIO host 202, a corresponding frame of N data packets is available in system memory 220.

Figure 3:
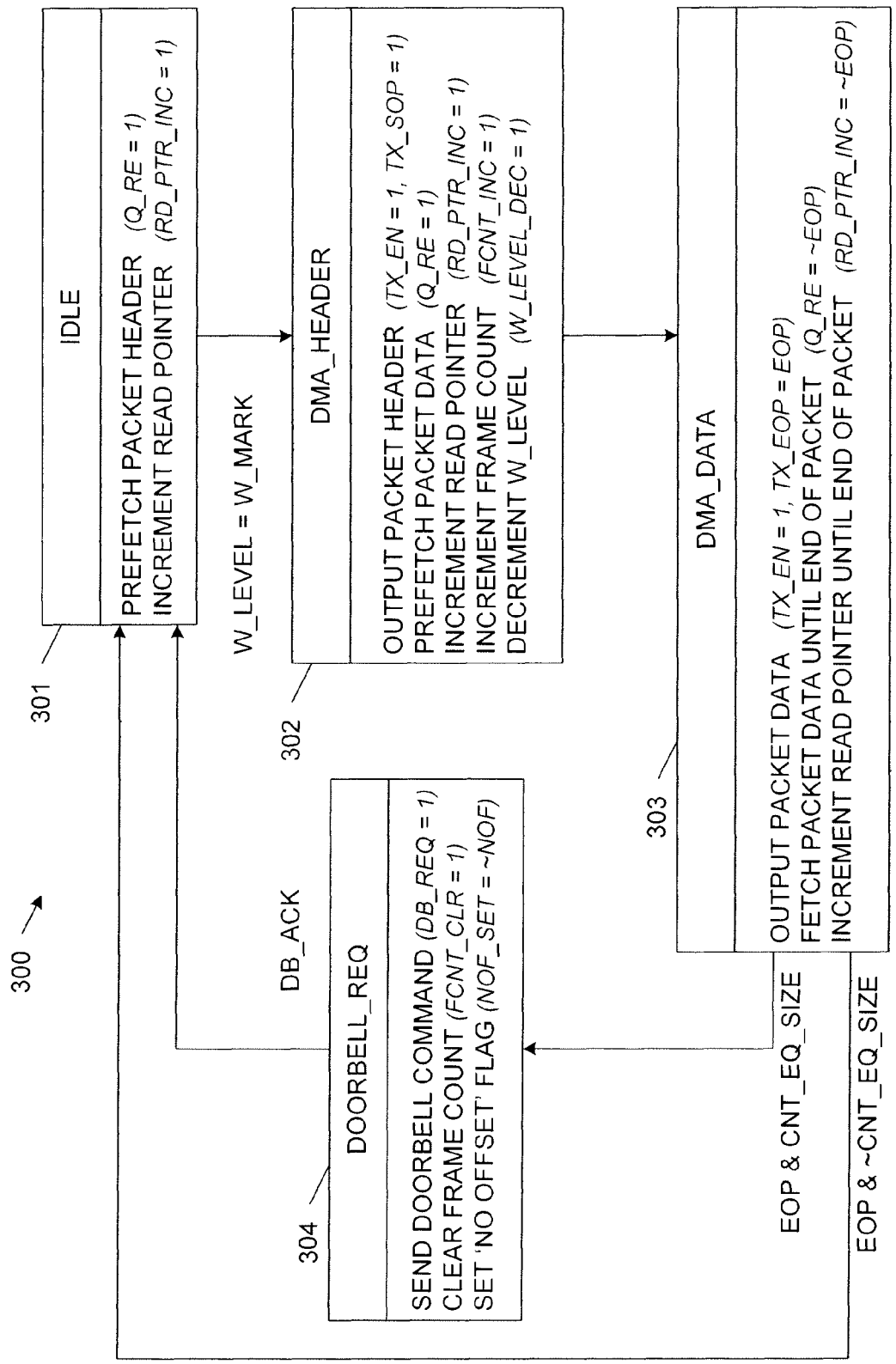
FIG. 3 is a flow diagram that defines data packet transfer and doorbell generation within the serial buffer of FIG. 2 in accordance with one embodiment of the present invention.

FIG. 3 is a flow diagram 300 illustrating a process implemented by doorbell controller 215 to generate doorbell commands in response to the transfer of data packets through the data packet transfer path 211, in accordance with one embodiment of the present invention. Initially, sRIO system 200 begins operation in an IDLE state 301. While in the IDLE state 301, doorbell controller 215 monitors the contents of each of the queues Q0-Q3 to determine whether the water level (W_LEVEL) of any of these queues reaches an associated water mark (W_MARK). If the water level of one of queues Q0-Q3 reaches its associated water mark (W_LEVEL=W_MARK), doorbell controller 215 selects this queue for further processing, which is described below. If more than one of queues Q0-Q3 reaches its associated water mark, doorbell controller 215 initially selects the queue having the highest assigned priority for further processing. After this high priority queue is processed, processing will proceed to the queue having the next highest priority. The queue currently being processed by doorbell controller 215 is hereinafter referred to as the 'selected' queue.

Upon detecting that a water level reaches a corresponding water mark in IDLE state 301, doorbell controller 215 asserts a queue read enable signal (Q_RE=1) associated with the selected queue, thereby causing a packet header to be read (pre-fetched) from the selected queue. Note that the read pointer of the selected queue is initially set to access the packet header of a first data packet stored in the selected queue. After the packet header has been pre-fetched, doorbell controller 215 increments the read pointer of the selected queue by activating a read counter increment signal (RD_P-TR_INC=1). At this time, the read pointer points to the first data value of the first data packet.

Processing then proceeds from IDLE state 301 to DMA_HEADER state 302. Within DMA_HEADER state, doorbell controller 215 enables a transmit enable signal (TX_EN=1), thereby causing the packet header pre-fetched in the IDLE state 301 to be transmitted to sRIO host 202 via sRIO bus 205. In addition, doorbell controller 215 activates a transmit start-of-packet signal (TX_SOP=1), which indicates that a new data packet is being transmitted to sRIO host 202.

Also in the DMA_HEADER state 302, doorbell controller 215 asserts the queue read enable signal (Q_RE=1) associated with the selected queue, thereby causing the first data value of the first data packet to be read (pre-fetched) from the selected queue. After this first data value has been pre-fetched, doorbell controller 215 increments the read pointer of the selected queue (RD_PTR_INC=1), such that this read pointer points to the second data value of the first data packet.

Before leaving the DMA_HEADER state 302, doorbell controller 215 increments a frame count value (F_COUNT) by activating a frame count increment signal (FCNT_INC=1). The frame count value F_COUNT is initially selected to have a zero value. By incrementing the frame count value F_COUNT each time that a packet header is read from the selected queue, the doorbell controller 215 maintains a running count of the number of data packets transmitted from the selected queue to sRIO host 202.

Also before leaving the DMA_HEADER state 302, doorbell controller 215 decrements the water level (W_LEVEL) of the selected queue by activating a water level decrement control signal (W_LEVEL_DEC=1).

Processing proceeds from DMA_HEADER state 302 to DMA_DATA state 303. Within DMA_DATA state 303, doorbell controller 215 enables the transmit enable signal (TX_EN=1), thereby causing the first data value pre-fetched in the DMA_HEADER state 302 to be transmitted to sRIO host 202 via sRIO bus 205. In addition, doorbell controller 215 extracts an end-of-packet identifier (EOP) from the first data value. This end-of-packet identifier is de-activated (EOP=0) if the first data value is not the last data value of the associated data packet. Conversely, this end-of-packet identifier is activated (EOP=1) if the first data value is the last data value of the associated data packet. The transmit end-of-packet signal is set equal to the end of packet identifier (TX_EOP=EOP). Note that the TX_EN, TX_SOP and TX_EOP signals (as well as the packet data retrieved from the selected queue) are internal bus signals before they are passed onto sRIO bus 205, and that these signals will be converted to a serial stream for transmission on sRIO bus 205 per the sRIO specification.

If the first data value is not the last data value of the associated packet (EOP=0), doorbell controller 215 reads the next (i.e., second) data value from the selected queue (i.e., from the location identified by the previously incremented read pointer). In the described embodiment, doorbell controller 215 implements this read operation by setting the queue read enable signal to equal the inverse of the end-of-packet identifier (Q_RE=~EOP).

Upon reading the next (second) data value from the selected queue, doorbell controller 215 increments the read pointer to point to the next (third) address of the selected queue. In the described embodiment, doorbell controller 215 increments the read pointer by setting the read pointer increment control signal equal to the inverse of the end-of-packet identifier (Q_RE=~EOP).

The above-described steps of the DMA_DATA state 303 are repeated, thereby sequentially reading data values of the first data packet from the selected queue and incrementing the associated read pointer, until the end-of-packet identifier of the data value transmitted to sRIO host 202 identifies the end of the first data packet (i.e., EOP=1). In response to the activated end-of-packet identifier of the first data packet, doorbell controller 215 deactivates the queue read enable signal and the read pointer increment signal (Q_RE=RD_PTR_INC=~EOP=0). At this time, the read pointer points to the packet header of the next data packet in the selected queue.

Upon detecting the activated end-of-packet identifier associated with the first data packet, doorbell controller 215 exits DMA_DATA state 303 and either: returns to IDLE state 301, or proceeds to DOORBELL_REQ state 304.

If the cumulative number of data packets transmitted from the selected queue to sRIO host 202 (as identified by the frame count value, F_COUNT) has not yet reached an adjustable frame size value (described below), then processing returns to IDLE state 301, where another data packet is read from the selected queue and transmitted to sRIO host 202. As described above in connection with DMA_HEADER state 302, reading another data packet from the selected queue will increment the frame count value (F_COUNT). When the frame count value (F_COUNT) reaches the adjustable frame size value (at the end of DMA_DATA state 303), the processing proceeds from DMA_DATA state 303 to DOORBELL_REQ state 304, wherein a doorbell command is issued.

In accordance with one embodiment of the present invention, doorbell controller 215 generates a control signal CNT_EQ_SIZE to indicate whether or not the frame count value (F_COUNT) has reached the adjustable frame size value (hereinafter, ADJ_F_SIZE). If the frame count value (F_COUNT) has reached the adjustable frame size (ADJ_F_SIZE), then the control signal CNT_EQ_SIZE is activated (CNT_EQ_SIZE=1), causing processing to proceed from DMA_DATA state 303 to DOORBELL_REQ state 304. Conversely, if the frame count value (F_COUNT) has not reached the adjustable frame size value (ADJ_F_SIZE), then the control signal CNT_EQ_SIZE is de-activated (CNT_EQ_SIZE=0), causing processing to proceed from DMA_DATA state 303 to IDLE state 301.

The generation of the control signal CNT_EQ_SIZE and the adjustable frame size value ADJ_F_SIZE will now be described in more detail.

Figure 4:
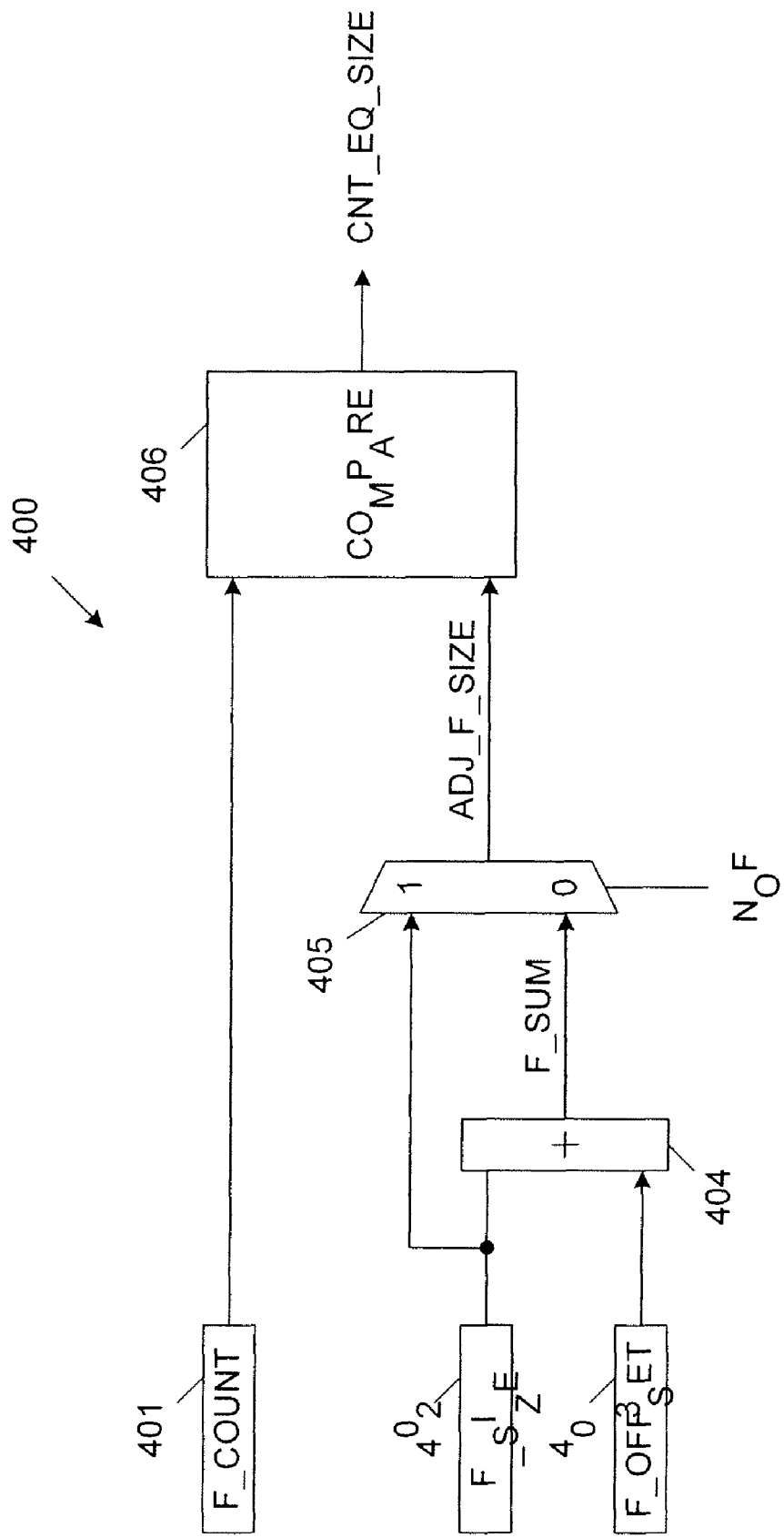
FIG. 4 is a block diagram of a control circuit used to generate a control signal which is used to initiate the generation of a doorbell command in accordance with one embodiment of the present invention.

FIG. 4 is a block diagram of a control circuit 400 used to generate the control signal CNT_EQ_SIZE in accordance with one embodiment of the present invention. Control circuit 400 includes frame count register 401, frame size register 402, frame offset register 403, addition block 404, multiplexer 405 and comparator 406. Frame count register 401 stores the frame count value F_COUNT described above in connection with FIG. 3.

Frame size register 402 stores the expected frame size value, F_SIZE. The expected frame size value F_SIZE, is set to equal the number of data packets that would normally be associated with a doorbell command. In the examples provided below, the expected frame size value F_SIZE is selected to equal 6 data packets (although other expected frame size values can be used in other embodiments). Note that the expected frame size value F_SIZE can alternately be provided by software within sRIO system 200.

Frame offset register 403 stores a programmable frame offset value (F_OFFSET). As described in more detail below, the frame offset value is selected to equal a number of data packets that represents the timing mismatch that exists between the data packet transfer path 211 and the doorbell command path. In an alternate embodiment, the frame offset value F_OFFSET can be provided by software within sRIO system 200.

The expected frame size F_SIZE and the frame offset value F_OFFSET are provided to input terminals of addition block 404. In response, addition block 404 provides an output signal (F_SUM) equal to the sum of the expected frame size F_SIZE and the frame offset value F_OFFSET. This output signal F_SUM is provided to the '0' input terminal of multiplexer 405. The expected frame size value F_SIZE is provided to the '1' input terminal of multiplexer 405.

Multiplexer 405 is controlled by a 'no offset' flag, NOF. When the no offset flag is reset (NOF=0), multiplexer 405 routes the F_SUM signal provided by addition block 404 as the adjustable frame size value ADJ_F_SIZE. That is, when the no offset flag NOF is reset, the frame offset value F_OFFSET is added to the expected frame size value F_SIZE to create the adjustable frame size value ADJ_F_SIZE. Conversely, when the no offset flag is set (NOF=1), multiplexer 405 routes the expected frame size value F_SIZE as the adjustable frame size value ADJ_F_SIZE. That is, when the no offset flag NOF is set, no offset is introduced to the expected frame size value F_SIZE.

Comparator 406 compares the frame count value F_COUNT with the adjustable frame size value ADJ_F_SIZE. The frame count value F_COUNT increases from zero in the manner specified by FIG. 3. While the frame count value F_COUNT is less than the adjustable frame size value ADJ_F_SIZE, comparator de-asserts the output signal CNT_EQ_SIZE (i.e., CNT_EQ_SIZE=0). When the frame count value F_COUNT reaches the adjusted frame size value ADJ_F_SIZE, comparator 406 activates the output signal CNT_EQ_SIZE (i.e., CNT_EQ_SIZE=1).

In accordance with one embodiment, the no offset flag NOF is initially reset to a logic '0' state, such that the adjustable frame size value ADJ_F_SIZE is initially equal to the sum of the frame size value F_SIZE and the frame offset value F_OFFSET. Because the frame count value F_COUNT is initially zero, the CNT_EQ_SIZE control signal is initially de-asserted low.

Returning now to FIG. 3, processing will proceed from DMA_DATA state 303 to DOORBELL_REQ state 304 for the first time when the frame count value F_COUNT reaches a value equal to the expected frame size F_SIZE plus the frame offset value F_OFFSET. For purposes of illustration, it is assumed that the frame offset value F_OFFSET is selected to have a value of 2 in the described examples (although the frame offset value can have other values in other embodiments). The frame offset value F_OFFSET is selected to correspond with the delay difference that exists between the data packet transfer path 211 and the doorbell command path. Thus, a frame offset value of '2' indicates that the delay introduced by the data packet transfer path 211 is greater than the associated with the doorbell command path by a duration equal to the time required to transmit two data packets through the data packet transfer path 211. In the present example (F_SIZE=6 and F_OFFSET=2), the CNT_EQ_SIZE signal is initially activated after the first 8 data packets have been transmitted from the selected queue to sRIO host 202 (i.e., when F_COUNT=8).

When the CNT_EQ_SIZE signal has been initially activated, and processing has entered the DOORBELL_REQ state 304, doorbell controller 215 activates a doorbell request signal (DB_REQ=1), which causes a doorbell command to be transmitted to sRIO host 202. Serial buffer 201 activates a doorbell acknowledge signal (DB_ACK=1) to indicate that the doorbell command has been transmitted to sRIO host 202. Upon detecting the activated doorbell acknowledge signal, doorbell controller 215 activates a frame counter clear signal (FCNT_CLR=1), which clears (resets) the frame count value F_COUNT to zero. In addition, doorbell controller 215 sets the 'no offset' flag (NOF=1). In the described embodiment, the 'no offset' flag is set by activating a 'no offset' flag set signal (NOF_SET). The 'no offset' flag set signal, in turn, is activated by setting this signal equal to the inverse of the 'no offset' flag (i.e., NOF_SET=~NOF). Processing then proceeds from DOORBELL_REQ state 304 to IDLE state 301.

After the 'no offset' flag has been set, the CNT_EQ_SIZE signal will be activated when the frame count value (F_COUNT) reaches the expected frame size value (F_SIZE). This occurs because the multiplexer 405 routes the frame size value (F_SIZE), rather than the F_SUM value, to comparator 406 in response to the set 'no offset' flag. Each time that the CNT_EQ_SIZE signal is activated (after the first time), processing will again enter the DOORBELL_REQ state 304, another doorbell command will be generated and transmitted to sRIO host 202, and the frame count value F_COUNT will again be reset to zero. However, the 'no offset' flag remains set (because NOF_SET=~NOF=0). Thus, after the first doorbell command is generated and transmitted in response to the frame count value F_COUNT reaching the expected frame size value F_SIZE plus the frame offset value F_OFFSET, subsequent doorbell commands are generated and transmitted in response to the frame count value F_COUNT reaching the expected frame size value F_SIZE.

Figure 5:
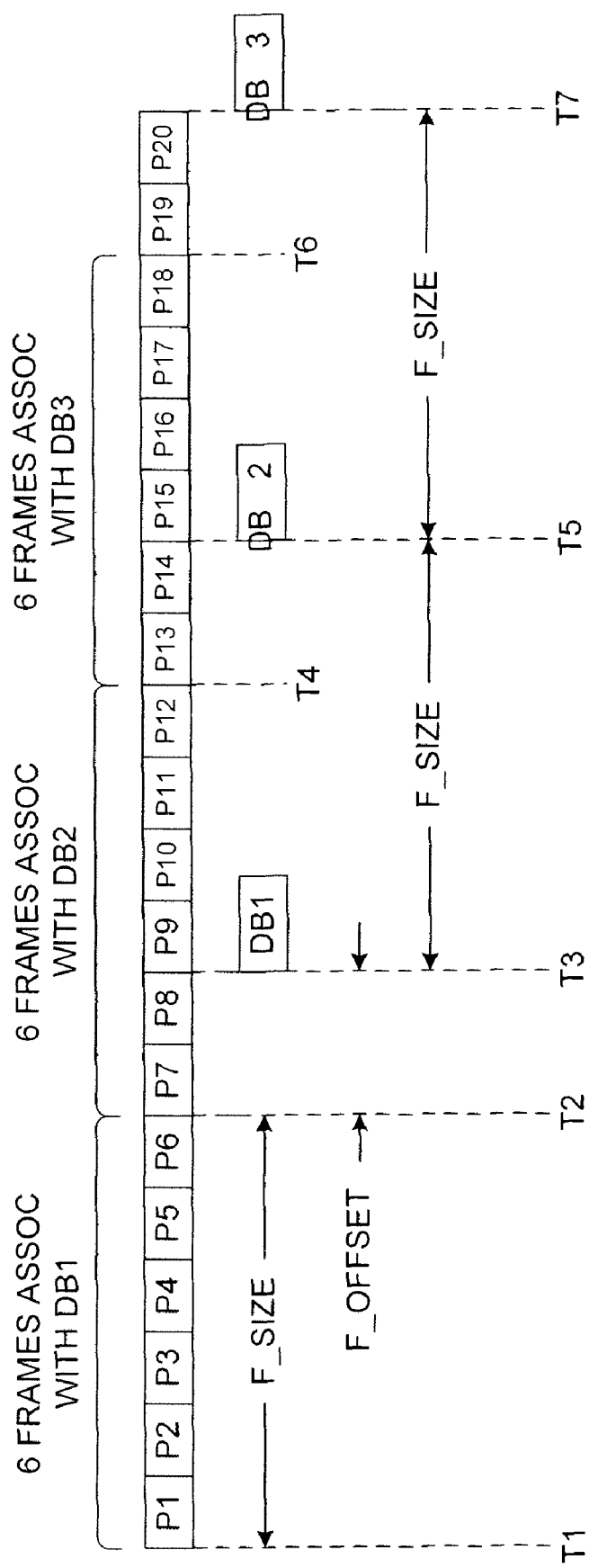
FIG. 5 is a timing diagram illustrating the relationship between transmission of data packets and doorbell commands in accordance with one embodiment of the present invention.

FIG. 5 is a timing diagram illustrating the manner in which doorbell commands are generated by serial buffer 201 in accordance with the present example. Data packets P1-P20 are transmitted through the data packet transfer path 211, starting at time T1. At time T2, the six data packets P1-P6 of the first frame associated with a first doorbell command DB1 have been transmitted through the data packet transfer path 211. However, not all of these six data packets P1-P6 have been stored in the system memory 220 of sRIO host 202 at this time. These six data packets P1-P6 are not guaranteed to be received by sRIO host 202 until time T3, when the next two 'offset' data packets P7-P8 have been transmitted through the data packet transfer path 211. At time T3, the first doorbell command DB1 is generated by doorbell controller 215. Upon receiving the first doorbell command DB1, sRIO host 202 processes this command, accessing the first frame of data packets P1-P6, which are guaranteed to be present in system memory 220 at this time. In this manner, real time processing of the data packets P1-P6 is enabled. As described above, the time between processing the first data packet P1 and activating the first doorbell request DB1 corresponds with the time required to process the six data packets (F_SIZE=6) associated with the first doorbell request DB1, plus the time required to process two additional 'offset' data packets (F_OFFSET=2).

At time T4, the six data packets of the second frame associated with a second doorbell command DB2 have been processed within the data packet transfer path 211. After two more data packets P13-P14 have been processed at time T5, the second doorbell command DB2 is generated by doorbell controller 215. Upon receiving the second doorbell command DB2, sRIO host 202 processes this command, accessing the second frame of data packets P7-P12, which are guaranteed to be present in system memory 220 at this time. In this manner, real time processing of the data packets P7-P12 is enabled. As described above, the time between activating the first doorbell command DB1 and activating the second doorbell command DB2 corresponds with the time required to process six data packets (F_SIZE=6).

Subsequent doorbell commands are activated after six data packets have been processed since activating the previous doorbell command. Thus, at time T6, the six data packets of the third frame associated with a third doorbell command DB3 have been processed within the first processing path 211. After two more data packets P19-P20 have been processed at time T7, the third doorbell command DB3 is generated by doorbell controller 215. Upon receiving the third doorbell command DB3, SRIO host 202 processes the six associated data packets P13-P18 of the third frame. As described above, the time between activating the second doorbell command DB2 and activating the third doorbell command DB3 corresponds with the time required to process six data packets (F_SIZE=6).

Because the data packets associated with each doorbell command are always available within sRIO host 202 at the time that the doorbell command is received by sRIO host 202, the response time of each doorbell command is both rapid and predictable. Moreover, because a fixed and exact number of data packets (e.g., 6) are guaranteed to be available when each doorbell command is received, real time processing of the data packets can be implemented, and the loss of sampled data is prevented.

In accordance with one embodiment of the present invention, the frame offset value F_OFFSET is adjusted dynamically in response to the actual delay that exists between the data packet transfer path 211 and the doorbell command path. This advantageously allows serial buffer 201 to operate in sRIO systems having different delays due to different system topologies.

Figure 6:
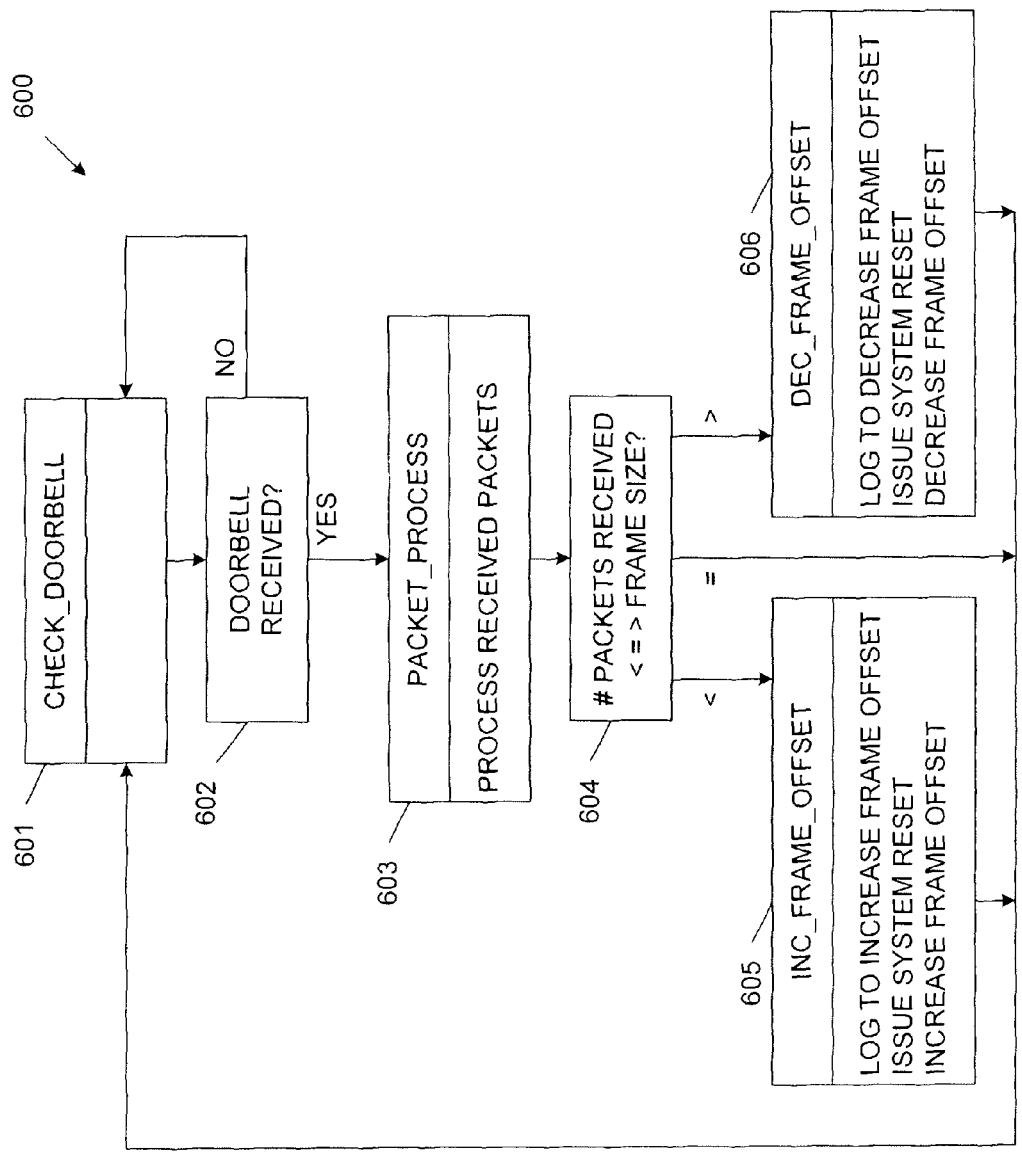
FIG. 6 is a flow diagram of a doorbell handler used to dynamically adjust delays introduced to doorbell commands in accordance with one embodiment of the present invention.

FIG. 6 is a flow diagram of a doorbell handler 600 implemented by the system software 221 to dynamically adjust the frame offset value F_OFFSET, in accordance with one embodiment of the present invention. Doorbell handler 600 is initially in the CHECK_DOORBELL state 601. From this state 601, processing proceeds to decision block 602, where the system software 221 in sRIO host 202 determines whether a doorbell command has been received from serial buffer 201. If not, processing returns to CHECK_DOORBELL state 601. However, if the system software 221 determines that a doorbell command has been received from serial buffer 201, then processing proceeds to PACKET_PROCESS state 603, wherein sRIO host 202 services the received doorbell command by retrieving the associated data packets from system memory 220.

Processing proceeds from PACKET_PROCESS state 603 to decision block 604. At this time, the system software 221 determines whether the number of data packets actually available in system memory 220 at the time that the doorbell command was serviced was less than, equal to, or greater than the expected number of data packets (F_SIZE). If the number of data packets actually available in system memory 220 was equal to the expected number of data packets, then the frame offset value (F_OFFSET) being used by serial buffer 201 was ideal to compensate for the delay difference between the fast processing path 212 and the slow processing path 211. In this case, no adjustment is necessary, as the system software 221 is immediately able to access the proper number of data packets from system memory 220 upon receiving the doorbell command. Thus, processing simply proceeds from decision block 604 to the CHECK_DOORBELL state 601.

However, if the system software 221 determines that the number of data packets actually available in system memory 220 was less than the expected number of data packets (F_SIZE), then the frame offset value (F_OFFSET) being used by the serial buffer 201 is not large enough to compensate for the delay difference between the doorbell processing path 212 and the data packet processing path 211. In this case, processing proceeds from decision block 604 to INC_FRAME_OFFSET state 605, wherein the frame offset value (F_OFFSET) is increased. In INC_FRAME_OFFSET state 605, the system software 221 issues a log to increase the frame offset value (F_OFFSET). The system software 221 then issues a system reset instruction. On system reset, the system software 221 increases the frame offset value (F_OFFSET) in response to the issued log. This is represented by the FRAME OFFSET ADJUST line in FIG. 2. Processing then returns to the CHECK_DOORBELL state 601.

Similarly, if the system software determines that the number of data packets actually available in system memory 220 was greater than the expected number of data packets (F_SIZE), then the frame offset value (F_OFFSET) being used by the serial buffer 201 is too large, such that the sRIO host 202 is being forced to wait longer than necessary to process received doorbell commands. In this case, processing proceeds from decision block 604 to DEC_FRAME_OFFSET state 606, wherein the frame offset value (F_OFFSET) is decreased. In DEC_FRAME_OFFSET state 606, the system software 221 issues a log to decrease the frame offset value (F_OFFSET) implemented by serial buffer 201. The system software 221 then issues a system reset instruction. On system reset, the system software 221 decreases the frame offset value (F_OFFSET) in response to the issued log. This is represented by the FRAME OFFSET ADJUST line in FIG. 2. Processing then returns to the CHECK_DOORBELL state 601.

In this manner, doorbell handler 600 dynamically adjusts the frame offset value (F_OFFSET), thereby optimizing the operation of serial buffer 201 in systems having different configurations.

Although the present invention has been described in connection with various embodiments, it is understood that variations of these embodiments would be obvious to one of ordinary skill in the art. Thus, the present invention is limited only by the following claims.

We claim:

1. A serial buffer comprising:
   a data packet transfer path configured to transmit a plurality of received data packets to a host processor; and
   a doorbell controller configured to monitor a number of data packets transmitted to the host processor on the data packet transfer path, estimate a number of data packets actually received by the host processor, and generate a doorbell command each time that the estimated number of data packets corresponds with a frame of data packets.

2. The serial buffer of claim 1, wherein the doorbell controller transmits the doorbell commands to the host processor on a doorbell command path, which is faster than the data packet transfer path, wherein the doorbell controller is configured to estimate the number of data packets actually received by the host processor in response to a first delay value that represents how much faster the doorbell command path is than the data packet transfer path.

3. The serial buffer of claim 2,
   wherein the first delay value is specified in units that are defined by a time required to transmit a data packet through the data packet transfer path.

4. The serial buffer of claim 2, wherein the doorbell controller is configured to generate a first doorbell command upon determining that a number of data packets transmitted to the host processor on the data packet transfer path is greater than a number of data packets in a frame of data packets.

5. The serial buffer of claim 4, wherein the doorbell controller is further configured to generate a second doorbell command upon determining that an additional number of data packets transmitted to the host processor on the data packet transfer path is equal to the number of data packets in a frame of data packets.

6. The serial buffer of claim 2, wherein the first delay value is dynamically adjustable in response an offset adjust signal that is representative of a number of data packets actually received by the host processor when a corresponding doorbell command is received by the host processor.

7. The serial buffer of claim 1, wherein the data packet transfer path comprises a plurality of queues configured to store received data packets.

8. The serial buffer of claim 7, wherein each of the queues has a corresponding water mark and a corresponding water level indicating a number of stored data packets to be transmitted, wherein each of the queues also includes means for indicating when the corresponding water level reaches the corresponding water mark.

9. The serial buffer of claim 7, wherein each of the queues corresponds with a different channel within the serial buffer.

10. A method of operating a serial buffer comprising:
    transmitting a plurality of received data packets through a data packet transfer path of a serial buffer to a host processor;
    monitoring a number of data packets transmitted to the host processor through the data packet transfer path;
    estimating a number of data packets actually received by the host processor from the data packet transfer path; and generating a doorbell command with the serial buffer each time that the estimated number of data packets corresponds with a number of data packets in a frame of data packets.

11. The method of claim 10, further comprising:
transmitting the doorbell command to the host processor on a doorbell command path, which is faster than the data packet transfer path; and
estimating the number of data packets actually received by the host processor in response to a first delay value that represents how much faster the doorbell command path is than the data packet transfer path.

12. The method of claim 11, further comprising specifying the first delay value in units that are defined by a time required to transmit a data packet through the data packet transfer path.

13. The method of claim 11, further comprising generating a first doorbell command upon determining that a number of data packets transmitted to the host processor on the data packet transfer path is greater than a number of data packets in a frame of data packets.

14. The method of claim 13, further comprising generating a second doorbell command upon determining that an additional number of data packets transmitted to the host processor on the data packet transfer path is equal to the number of data packets in a frame of data packets.

15. The method of claim 11, further comprising dynamically adjusting the first delay value in response an offset adjust signal that is representative of a number of data packets actually received by the host processor when a corresponding doorbell command is received by the host processor.

16. The method of claim 15, further comprising selecting the offset adjust signal to reduce the first delay value when the number of data packets actually received by the host processor when the corresponding doorbell command is received by the host processor is greater than the estimated number of data packets.

17. The method of claim 15, further comprising selecting the offset adjust signal to increase the first delay value when the number of data packets actually received by the host processor when the corresponding doorbell command is received by the host processor is less than the estimated number of data packets.

18. The method of claim 10, further comprising storing the plurality of received data packets in one or more queues located in the data packet transfer path.

19. The method of claim 18, further comprising initiating the transfer of data packets from a queue when a water level of the queue reaches a corresponding water level of the queue.

* * * * *